US012779372B2

(12) United States Patent
Al-Zayer et al.

(10) Patent No.: US 12,779,372 B2
(45) Date of Patent: Nov. 3, 2026

(54) AUTOMATED AND SELF-CLEANING GRAVEL PACK FILTER SYSTEM FOR WATER TREATMENT AND DISPOSAL

(71) Applicant: SAUDI ARABIAN OIL COMPANY, Dhahran (SA)

(72) Inventors: Rayed Mohammed Al-Zayer, Tarout (SA); James Ohioma Arukhe, Dhahran (SA); Suhail Abdullah Samman, Riyadh (SA); Ayman R. Nakhli, Dammam (SA); Wajdi M. Buhaezah, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 410 days.

(21) Appl. No.: 18/525,458

(22) Filed: Nov. 30, 2023

(65) Prior Publication Data

US 2025/0177895 A1 Jun. 5, 2025

(51) Int. Cl.

*B01D 24/46* (2006.01)
*B01D 24/02* (2006.01)

(Continued)

(52) U.S. Cl.

CPC ............. *B01D 24/46* (2013.01); *B01D 24/02* (2013.01); *B01D 24/10* (2013.01); *B01D 24/183* (2013.01);

(Continued)

(58) Field of Classification Search

CPC ...... B01D 24/02; B01D 24/10; B01D 24/183; B01D 24/205; B01D 24/22; B01D 24/383;

(Continued)

(56) References Cited

U.S. PATENT DOCUMENTS 10,123,456 B2 11/2018 Evans et al.
2019/0023587 A1* 1/2019 Noles .................. B01D 24/007

FOREIGN PATENT DOCUMENTS

CN 104209151 A 12/2014
CN 114073871 A 2/2022

(Continued)

OTHER PUBLICATIONS

Dunsmuir, I. et al., "The Deployment of Ceramic Membrane Technology to Treat Stable Oil in Emulsions in Produced Water Offshore"; Proceedings of the SPE Offshore Europe Conference & Exhibition; Paper No. SPE-186131-MS; pp. 1-8; Sep. 5, 2017 (8 pages).

(Continued)

*Primary Examiner* — John Kim

(74) *Attorney, Agent, or Firm* — Osha Bergman Watanabe & Burton LLP

(57) ABSTRACT

A system includes a filtration vessel, a filtration input gauge, a filtration output gauge, a solvent vessel, an acid vessel, a water vessel, a computer, and a control system. The filtration vessel includes gravel configured to filter a produced water to create a filtered water. The filtration input gauge is configured to measure an inlet pressure of the produced water flowing into the filtration vessel. The filtration output gauge is configured to measure an outlet pressure of the filtered water flowing out of the filtration vessel. The computer is communicably connected to the filtration input gauge and the filtration output gauge and is configured to determine a differential pressure based on the inlet pressure and the outlet pressure. The control system is communicably connected to the computer and is configured to prevent the produced water from flowing to the filtration vessel and allow solvent, acid, and water to flow to the filtration vessel (Continued)

when the computer determines the differential pressure is greater than a pre-determined value.

10 Claims, 4 Drawing Sheets

(51) Int. Cl.

| | |
|---|---|
| ***B01D 24/10*** | (2006.01) |
| ***B01D 24/18*** | (2006.01) |
| ***B01D 24/20*** | (2006.01) |
| ***B01D 24/22*** | (2006.01) |
| ***B01D 24/38*** | (2006.01) |
| ***B01D 39/06*** | (2006.01) |
| ***B01D 41/00*** | (2006.01) |
| ***B01D 41/02*** | (2006.01) |

(52) U.S. Cl.
CPC .......... *B01D 24/205* (2013.01); *B01D 24/22* (2013.01); *B01D 24/383* (2013.01); *B01D 24/4694* (2013.01); *B01D 39/06* (2013.01); *B01D 41/00* (2013.01); *B01D 41/02* (2013.01)

(58) Field of Classification Search
CPC .... B01D 24/46; B01D 24/4694; B01D 39/06; B01D 41/00; B01D 41/02
See application file for complete search history.

(56) References Cited

FOREIGN PATENT DOCUMENTS

| | | |
|---|---|---|
| EP | 2 345 678 A1 | 7/2011 |
| KR | 101537784 B1 | 7/2015 |

OTHER PUBLICATIONS

Ghafoori, Samira et al., "New advancements, challenges, and future needs on treatment of oilfield produced water: A state-of-the-art review"; Separation and Purification Technology; vol. 289, Article 120652; May 15, 2022 (28 pages).
BMS Factories, "Gravel For Water Treatment Filteration Media"; < https://www.bm.com.sa/product/gravel-for-water-treatment-filtration-media/>; Acccessed Nov. 30, 2023 (7 pages).
Texas A&M AgriLife Extension Service, "Sand/Gravel Filter"; On-Site Sewage Facilities (OSSF); <https://ossf.tamu.edu/sandgravel-filter/>; Accessed Nov. 30, 2023 (3 pages).

* cited by examiner

AUTOMATED AND SELF-CLEANING GRAVEL PACK FILTER SYSTEM FOR WATER TREATMENT AND DISPOSAL

BACKGROUND

Hydrocarbons are located in porous rock formations beneath the Earth's surface. Wells are drilled into the formations to produce the hydrocarbons. Often, the produced fluid from the well includes a mixture of hydrocarbons and water. Furthermore, the hydrocarbons may exist in multiple phases (i.e., gas and liquid). As such, separation plants are often located at or near a field of wells to separate the produced fluid into the various components.

As outlined above, one of the separated fluids is produced water. The produced water may be disposed of using injection wells. By injecting the produced water into the formation using the injection wells, the produced water aids in maintaining or increasing formation pressure and may be used to sweep residual hydrocarbons to the production wells.

In order to inject the produced water into the formation, the produced water must reach specific specifications so as to not harm equipment or the environment. As such, after the produced water is separated from the hydrocarbons, the produced water undergoes further filtration to remove organic and in-organic material. Produced water may be more contaminated when compared to other sources of water, thus, conventional water filtration systems often fail to filter the produced water to specifications required for downhole disposal.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments, methods and systems for enabling a self-cleaning operation in a filtration vessel. The system includes a filtration vessel, a filtration input gauge, a filtration output gauge, a solvent vessel, an acid vessel, a water vessel, a computer, and a control system. The filtration vessel comprises gravel configured to filter a produced water to create a filtered water. The filtration input gauge is configured to measure an inlet pressure of the produced water flowing into the filtration vessel. The filtration output gauge is configured to measure an outlet pressure of the filtered water flowing out of the filtration vessel. The solvent vessel comprises a solvent configured to dissolve organic deposits in the gravel located in the filtration vessel. The acid vessel comprises an acid configured to dissolve in-organic deposits in the gravel located in the filtration vessel. The water vessel comprises water configured to flush the solvent and the acid from gravel located in the filtration vessel of the solvent and the acid. The computer is communicably connected to the filtration input gauge and the filtration output gauge and is configured to determine a differential pressure based on the inlet pressure and the outlet pressure. The control system is communicably connected to the computer and is configured to prevent the produced water from flowing to the filtration vessel and allow the solvent, acid, and water to flow to the filtration vessel when the computer determines the differential pressure is greater than a pre-determined value.

The method includes filtering a produced water through a filtration vessel comprising gravel to create a filtered water, measuring an inlet pressure of the produced water flowing into the filtration vessel using a filtration input gauge and measuring an outlet pressure of the filtered water flowing out of the filtration vessel using a filtration output gauge, and determining a differential pressure based on the inlet pressure and the outlet pressure using a computer communicably connected to the filtration input gauge and the filtration output gauge. The method also includes preventing the produced water from flowing to the filtration vessel using a control system, communicably connected to the computer, when the computer determines the differential pressure is greater than a pre-determined value, pumping a solvent, using the control system, from a solvent vessel into the filtration vessel to dissolve organic deposits in the gravel when the computer determines the differential pressure is greater than the pre-determined value, and pumping an acid, using the control system, from an acid vessel into the filtration vessel to dissolve in-organic deposits in the gravel when the computer determines the differential pressure is greater than the pre-determined value. The method further includes pumping water, using the control system, from a water vessel into the filtration vessel to flush the solvent and the acid from the gravel when the computer determines the differential pressure is greater than the pre-determined value.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
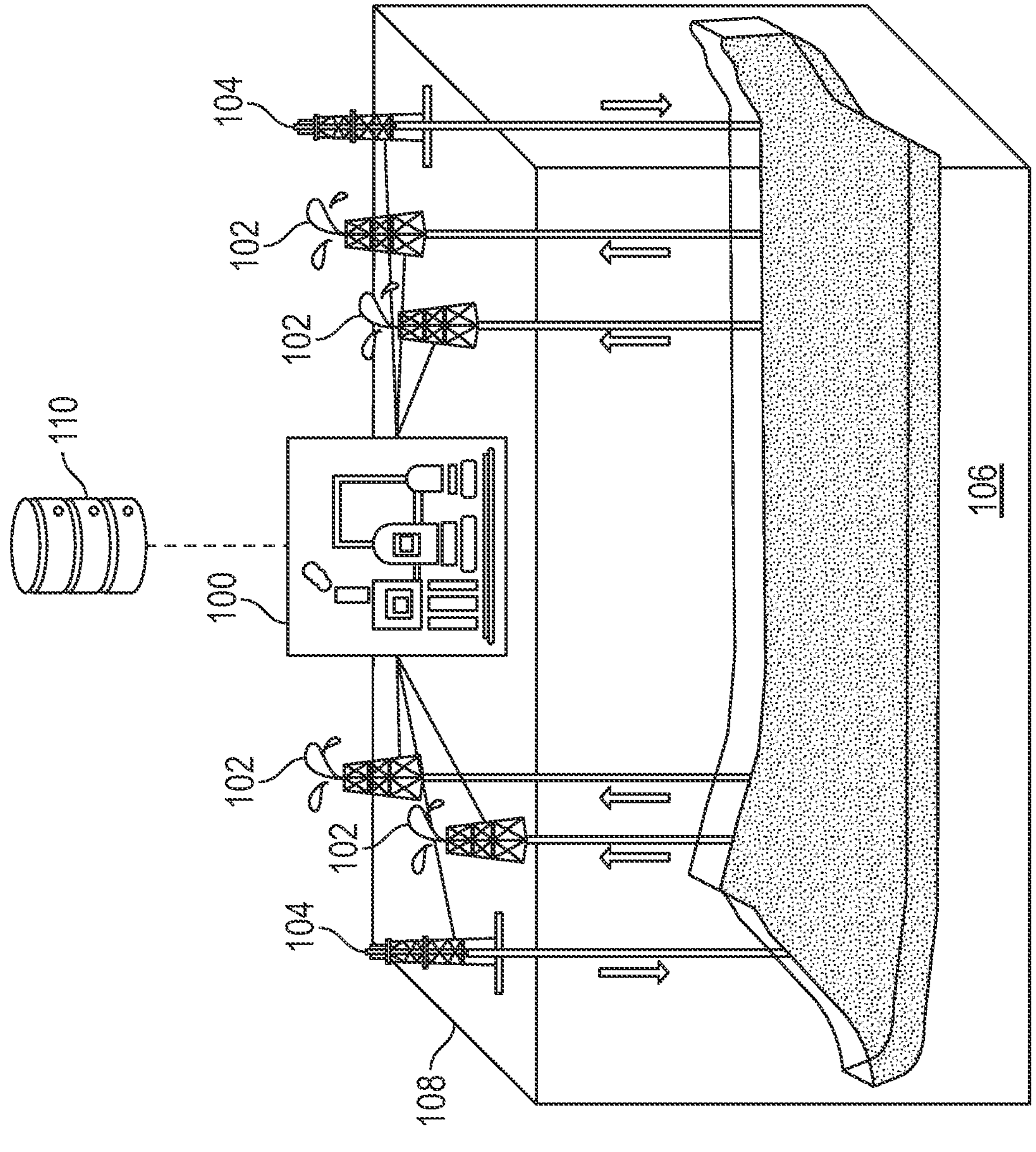
FIG. 1 shows a separation plant, a plurality of production wells, and a plurality of injection wells in accordance with one or more embodiments.

FIG. 1 shows a separation plant (100), a plurality of production wells (102), and a plurality of injection wells (104) in accordance with one or more embodiments. Although, only a small number of production and injection wells (104) are displayed, a person skilled in the art will appreciate that many production and injection wells (104) may be connected to/associated with the separation plant (100).

In accordance with one or more embodiments, production wells (102) draw produced fluids (e.g., oil, produced water, and gas), from a subsurface reservoir (106) in a hydrocarbon field (108). Each production well (102) is connected, such as by a pipeline, to the separation plant (100). The produced fluid may be transported via the connection to the separation plant (100).

At the separation plant (100), the oil, gas, and produced water may be separated from one another using various equipment and processes. Gas drawn up from the subsurface as a produced fluid may also be referred to as "associated gas," since it is the gas that is associated with oil production. Herein, we refer to gas and associated gas simply as "gas."

As depicted in FIG. 1, the separation plant (100) is connected to a plurality of injection wells (104). The injection wells (104) inject the produced water (and, in some embodiments, the gas) into the subsurface reservoir (106). Re-injection into the subsurface reservoir (106) may serve two purposes, firstly, disposal of the produced water (and, in some embodiments, the gas) and secondly, to provide pressure support within the subsurface reservoir (106) or, in the case of re-injection of the gas, artificial lift in certain field developments where a gas lift system is needed.

In order to inject the produced water back into the subsurface reservoir (106), the produced water must reach specific purity/cleanliness specifications (e.g., less than 50 parts-per million (ppm) oil, less than 2 ppm iron, and no particles greater than 2 microns) so as to not harm equipment, people, the environment, or the subsurface reservoir (106). As such, after the produced water is separated from the hydrocarbons, the produced water undergoes further filtration to remove organic and in-organic material. This further filtration may occur in the separation plant (100) or elsewhere at the hydrocarbon field (108) between the separation plant (100) and the injection wells (104), such as along the pipelines, without departing from the scope of the disclosure herein.

Produced water may be more contaminated when compared to other sources of water, thus, conventional water filtration systems often fail to filter the produced water to specifications required for downhole disposal. Furthermore, the volume of the produced water may be large, and the filtration system may need to be more efficient than conventional filtrations systems so that the filtration system can handle the large volume of produced fluids.

As such, the present disclosure outlines an automated and self-cleaning filtration system that can be used to efficiently filter the produced water and ensure the produced water is filtered to the proper specifications. The automation capabilities of the filtration system presented herein allow the filtration system to act as efficiently as possible. The self-cleaning capabilities of the filtration system enable the filtration system to clean itself of build-up and debris from the produced water and the automation of the filtration system further allows for the self-cleaning system to act as efficiently as possible.

Figure 2:
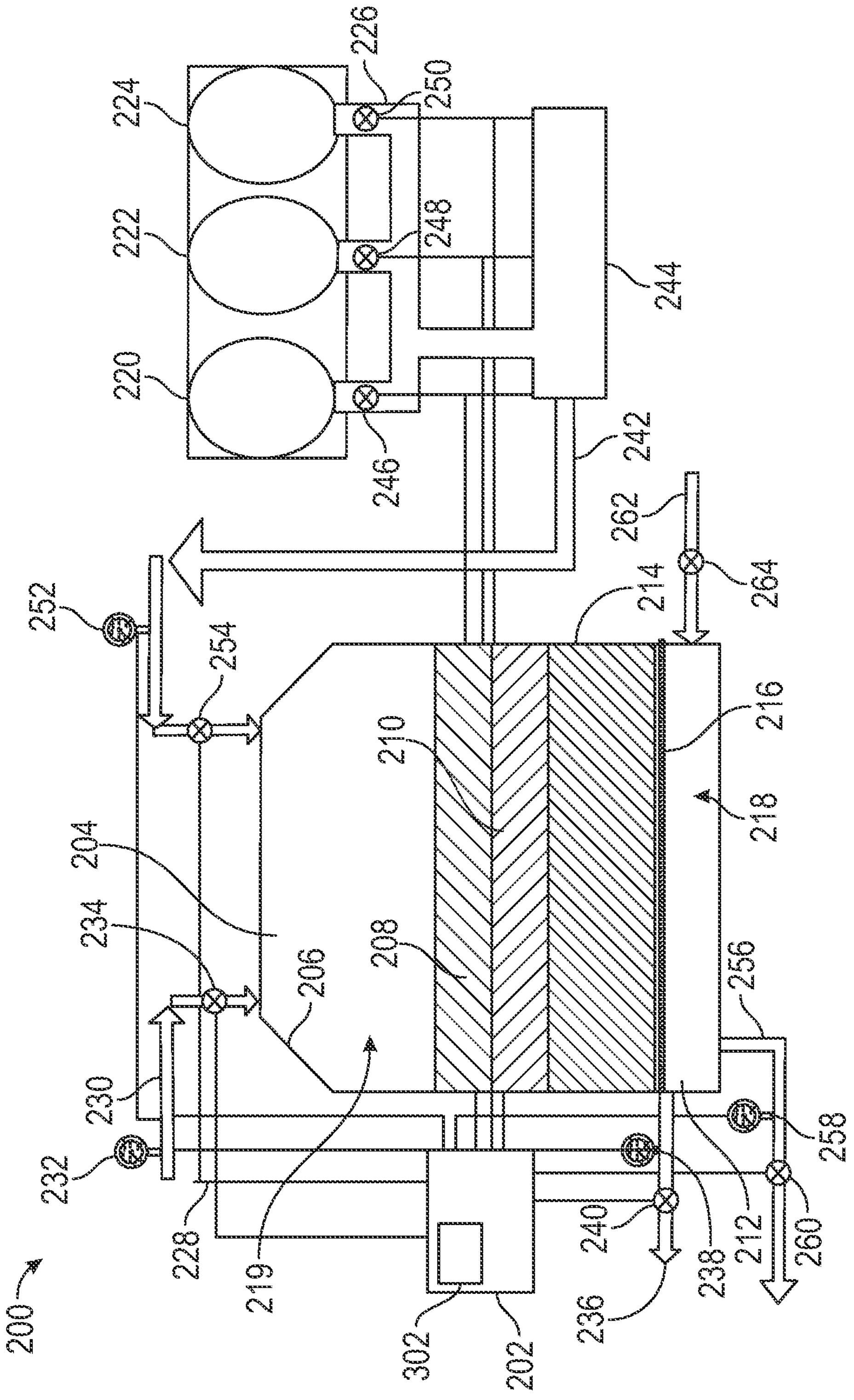
FIG. 2 shows a water filtration system in accordance with one or more embodiments.

FIG. 2 shows a water filtration system (200) in accordance with one or more embodiments. Specifically, FIG. 2 shows a water filtration system (200) that may be used to filter produced water from production wells (102). The filtered water from the water filtration system (200) may then be transported to the injection wells (104) to inject the filtered water into the subsurface reservoir (106). This operation may be automated using a control system (202) and a series of pressure gauges and valves. Furthermore, the water filtration system (200) shown in FIG. 2 has the ability to perform a self-cleaning operation.

A person skilled in the art will appreciate that while the water filtration system shown in FIG. 2 can be used as outlined above, the water filtration system (200) outlined herein is not limited to usage in separation plants (100)/injection wells (104) and may be used in any application that requires a water filtration system (200).

In accordance with one or more embodiments, the water filtration system (200) has a filtration vessel (204). Gravel is disposed within the interior of the filtration vessel (204). The gravel may be used to filter the produced water. In accordance with one or more embodiments, the gravel is layered within the filtration vessel (204) from coarsest, near a top end (206) of the filtration vessel (204), to finest, near a bottom end (212) of the filtration vessel (204). In further embodiments, the gravel used herein is resistant to acids, such as HCl and H2S, and solvents. Furthermore, the gravel used herein can withstand high temperatures and pressures.

In accordance with one or more embodiments, and as shown in FIG. 2, the filtration vessel (204) may contain three layers of gravel. The first layer of gravel, closest to the top end (206) of the filtration vessel (204), may be course gravel (208) having an equivalent of 60 mesh size. The middle layer of gravel may be medium gravel (210) having an equivalent of 40 mesh size. The third layer of gravel, closest to the bottom end (212) of the filtration vessel (204), may be fine gravel (214) having an equivalent of 20 mesh size.

In further embodiments, a mesh sheet (216) is located beneath the fine gravel (214). The mesh sheet (216) holds the three layers of gravel off of the bottom end (212) of the filtration vessel to create a lower void (218) within the filtration vessel (204). The mesh sheet (216) is also used to further filter the produced water as the mesh sheet (216) has an equivalent of less than 20 mesh size. Herein, the term "void" is not meant to be limiting and the "void" may be filled or periodically filled with water, solvent, and/or acid without departing from the scope of the disclosure herein. Furthermore, an upper void (219) exists above the course gravel (208).

In further embodiments, the water filtration system (200) has two or more filtration vessels (204). While not pictured, a person skilled in the art will appreciate that any number of filtration vessels (204) may be in the water filtration system (200). In accordance with one or more embodiments, multiple filtration vessels (204) may be used in series to further filter the produced water, depending on the required specifications. That is, the produced water may be filtered at a first filtration vessel (204) and the filtered water may pass through a second filtration vessel (204) to be further filtered.

Furthermore, there may be one or more backup filtration vessels (204) in the water filtration system (200) so that when one filtration vessel (204) is undergoing a self-cleaning operation, the produced water may be diverted to one of the backup filtration vessels (204). This allows the filtration operation to continue while the other filtration vessel (204) is undergoing a self-cleaning operation. In other embodiments, there may be multiple filtration vessels (204) that act in parallel so that a larger volume of produced water can be filtered.

In accordance with one or more embodiments, the water filtration system (200) includes three vessels that are used during the self-cleaning operation. Specifically, the water filtration system (200) may include a solvent vessel (220), an acid vessel (222), and a fresh water vessel (224).

The solvent vessel (220) may have solvent disposed therein. The solvent may be used to dissolve organic deposits. In accordance with one or more embodiments the solvent may be any type of solvent known in the art. For example, the solvent may be xylene for dissolving organic deposits like asphaltenes. The solvent may also be toluene which is similar to xylene and may also be used for dissolving organic materials. Furthermore, the solvent may be methanol which may be used for its ability to dissolve a wide range of organic compounds.

The acid vessel (222) may have acid disposed therein. The acid may be used to dissolve inorganic deposits. In accordance with one or more embodiments the acid may be any type of acid known in the art. For example, the acid may be hydrochloric acid (HCl) and may be used to dissolve inorganic deposits such as scales. The acid may also be sulfuric acid (H2SO4) which may be effective for dissolving certain types of scale and inorganic material. Furthermore, the acid may also be acetic acid which is a milder acid, and may be used for more delicate cleaning operations.

The fresh water vessel (224) may have fresh water disposed therein. The fresh water may be used to flush the gravel in the filtration vessel (204). In accordance with one or more embodiments the fresh water vessel may have potassium chloride (KCl) water disposed therein. The KCl water may be used instead of or in addition to fresh water to prevent swelling of certain types of clays or for other operational reasons.

A cleaning manifold (226) having a plurality of valves is used to hydraulically connect the acid vessel (222), the solvent vessel (220), and the fresh water vessel (224) to the filtration vessel (204) in order perform the self-cleaning operation, further outlined below.

As described above, the water filtration system (200) includes a control system (202) that enables the water filtration system (200) to have automated capabilities. Specifically, the control system (202) has a computer (302) system, further outlined below in FIG. 3. The computer (302) system processes data to instruct the control system (202) when to open and close various valves within the water filtration system (200). Specifically, the plurality of valves and gauges shown in FIG. 2 are connected to the control system via a series of control lines (228).

In accordance with one or more embodiments, the control lines (228) that connect the valves to the control system (202) may be hydraulic control lines. Thus, the control system (202) can open/close a specific valve by applying hydraulic pressure, using hydraulic fluid, along the control line (228) connected to the specific valve. In further embodiments, the control lines (228) connected to the gauges may be electrically conductive lines, such as electrically conductive wires, that permit the transmission of data, such as pressure data, from the gauge to the control system (202).

As such, the computer (302) may receive pressure data from the gauges via the control lines (228) and may use stored equations/instructions to determine if any valves need to be opened or closed and to determine if the filtration vessel (204) needs to be cleaned based on the pressure data. When the computer (302) makes a determination that a specific valve needs to be opened or closed, the computer (302) may automatically send a signal to the control system (202) to apply or release hydraulic pressure on the control line (228) connected to the specific valve.

As outlined above, the water filtration system (200) has two primary functionalities. The first functionality includes filtering produced water, and the second functionality includes performing a self-cleaning operation. Turning to the first functionality and in accordance with one or more embodiments, the produced water flows from the separation plant (100) (or from sub-system within the separation plant) to an inlet on a filtration vessel (204).

Specifically, the produced water may flow along a filtration input line (230). The filtration input line (230) may be any conduit, such as a pipeline, that is hydraulically connected between a source of the production water, such as an oil-water-gas separation system in the separation plant (100), and the filtration vessel (204).

The filtration input line (230) may have a filtration input gauge (232) that measures the inlet pressure of the filtration vessel (204). The filtration input line (230) may also have a filtration input valve (234). In accordance with one or more embodiments, the filtration input gauge (232) measures the inlet pressure of the produced fluid flowing into the filtration vessel (204). The filtration input gauge (232) transmits the inlet pressure to the computer (302) in the control system (202) via the control lines (228). The filtration input valve (234) is controllably connected to the control system (202) via the control lines (228).

In accordance with one or more embodiments, the produced water enters the upper void (219) of the filtration vessel (204) and is filtered through the course gravel (208), the medium gravel (210), the fine gravel (214), and the mesh sheet (216) into the lower void (218). The filtered water exits the lower void (218) through a filtration output line (236). The filtration output line (236) transmits the filtered water away from the filtration vessel (204) to a secondary location, such as to an injection well (104) or to another filtration vessel (204). As such, the filtration output line (236) is a conduit, such as a pipeline, that is hydraulically connected between the filtration vessel (204) and the secondary location, such as an injection well (104).

The filtration output line (236) may have a filtration output gauge (238) that measures the outlet pressure of filtered fluid flowing out of the filtration vessel (204). The filtration output line (236) may also have a filtration output valve (240). In accordance with one or more embodiments, the filtration output gauge (238) measures the output pressure of the filtered fluid flowing out of the filtration vessel (204). The filtration output gauge (238) transmits the outlet pressure to the computer (302) in the control system (202) via the control lines (228). The filtration output valve (240) is controllably connected to the control system (202) via the control lines (228).

In accordance with one or more embodiments, the computer (302) may receive both the inlet pressure and the outlet pressure of the water being filtered through the filtration vessel (204). The computer (302) may use the inlet pressure and the outlet pressure to determine the pressure differential of the filtration vessel (204). The differential pressure may represent a buildup of material within the gravel of the filtration vessel (204). Thus, the computer (302) may be programmed with instructions to automatically trigger the self-cleaning operation when the differential pressure exceeds a pre-determined value.

In accordance with one or more embodiments, the pre-determined value may be based on the pressure differential of the produced water flowing through clean gravel when the filtration vessel (204) is first used. In other embodiments, the pre-determined value may be based on produced water flowing through the gravel immediately after the gravel has been cleaned.

When the self-cleaning operation is triggered by the computer (302), the computer (302) may automatically send a signal to the control system (202) to close the filtration input valve (234) and the filtration output valve (240). As outlined above, the produced water may be diverted to a backup or secondary filtration vessel (204) so that the filtration operation can occur simultaneously with the self-cleaning operation.

Turning to the self-cleaning operation, the solvent vessel (220), the acid vessel (222), and the fresh water vessel (224) are hydraulically connected to the filtration vessel (204) via the cleaning manifold (226) and a cleaning input line (242). The cleaning input line (242) is a conduit, such as a pipeline, that hydraulically connects the cleaning manifold (226) to the filtration vessel (204).

The cleaning manifold (226) is connected to a pump (244) that may be used to pump the solvent, acid, or fresh water to the filtration vessel (204) via the cleaning input line (242). In accordance with one or more embodiments, the cleaning manifold (226) includes a solvent vessel valve (246), an acid vessel valve (248), and a fresh water vessel valve (250).

The solvent vessel valve (246) is controllably connected to the control system (202) such that the control system (202) can open the solvent vessel valve (246) to place the solvent vessel (220) in hydraulic communication with the cleaning input line (242). The acid vessel valve (248) is controllably connected to the control system (202) such that the control system (202) can open the acid vessel valve (248) to place the acid vessel (222) in hydraulic communication with the cleaning input line (242). The fresh water vessel valve (250) is controllably connected to the control system (202) such that the control system (202) can open the fresh water vessel valve (250) to place the fresh water vessel (224) in hydraulic communication with the cleaning input line (242).

As outlined above, the cleaning input line (242) connects the cleaning manifold (226) to the filtration vessel (204). In accordance with one or more embodiments, the cleaning input line (242) is connected to the top end (206) of the filtration vessel (204). The cleaning input line (242) may have a cleaning input gauge (252). The cleaning input gauge (252) may measure an inlet pressure of the solvent, acid, or fresh water being pumped into the filtration vessel (204). The cleaning input gauge (252) may transmit the inlet pressure to the computer (302) in the control system (202). The cleaning input line (242) may have a cleaning input valve (254) controllably connected to the control system (202).

In accordance with one or more embodiments, a cleaning output line (256) is connected to the bottom end (212) of the filtration vessel (204). The cleaning output line (256) may transport the solvent, acid, or fresh water from the lower void (218) of the filtration vessel (204) to a secondary location.

The cleaning output line (256) may have a cleaning output gauge (258). The cleaning output gauge (258) may measure an outlet pressure of the solvent, acid, or fresh water flowing out of the filtration vessel (204). The cleaning output gauge (258) may transmit the outlet pressure to the computer (302) in the control system (202). The cleaning output line (256) may have a cleaning output valve (260) that is controllably connected to the control system (202).

In accordance with one or more embodiments, when the computer (302) triggers the control system (202) to begin the self-cleaning operation, the control system (202) closes the filtration input valve (234) and the filtration output valve (240) to stop the produced water form flowing through the filtration vessel (204). As outlined above, the produced water may be diverted to a second filtration vessel (204) to continue the filtration operation. If so, the control system (202) may be configured to automate the valves there as well.

With the filtration input valve (234) and the filtration output valve (240) closed, the control system (202) may open the cleaning input valve (254) and the solvent vessel valve (246). The control system (202) may also instruct the pump (244) to turn on. The pump (244) may also be turned on manually without departing from the scope of the disclosure herein.

The pump (244) may pump the solvent from the solvent vessel (220) to the filtration vessel (204) via the cleaning manifold (226) and the cleaning input line (242). When the solvent is initially being pumped into the filtration vessel (204), the cleaning output valve (260) may be opened to allow the produced and filtered water remaining in the filtration vessel (204) to be displaced.

The computer (302) may use a pressure differential between the cleaning input gauge (252) and the cleaning output gauge (258), a pre-programmed amount of time, or a pump rate of the pump (244) and a volume of the filtration vessel (204) to determine how long the solvent should be pumped to displace the produced and filtered water remaining in the filtration vessel (204).

Once the computer (302) has determined that the solvent has fully displaced the produced fluids in the filtration vessel (204), the pump (244) may be turned off (manually or through the control system (202)), and the cleaning output valve (260) may be closed via the control system (202) and the control lines (228) in order to allow the solvent to soak the gravel for a predetermined amount of time (e.g., one hour).

The solvent vessel valve (246) may be closed before, during, or after the solvent soaks the gravel. After the solvent vessel valve (246) is closed and after the solvent has soaked the gravel for the predetermined amount of time, the computer (302) may instruct the control system (202) to open the acid vessel valve (248) and the cleaning output valve (260). Using the same methodology as outlined above with respect to the solvent, the acid may be pumped from the acid vessel (222) to the filtration vessel (204) to displace the solvent in the filtration vessel (204).

Once the computer (302) has indicated that the acid has fully displaced the solvent in the filtration vessel (204), the pump (244) may be turned off (manually or through the control system (202)) and the cleaning output valve (260) may be closed via the control system (202) and the control lines (228) in order to allow the acid to soak the gravel for a predetermined amount of time (e.g., one hour).

The acid vessel valve (248) may be closed before, during, or after the acid soaks the gravel. After the acid vessel valve (248) is closed and after the acid has soaked the gravel for the predetermined amount of time, the computer (302) may instruct the control system (202) to open the fresh water vessel valve (250) and the cleaning output valve (260). Using the same methodology as outlined above with respect to the solvent and acid, the fresh water may be pumped from the fresh water vessel (224) to the filtration vessel (204) to displace the acid in the filtration vessel (204).

The fresh water is used to flush the gravel and displace all residual acids and solvents from the filtration vessel (204). In accordance with one or more embodiments, the volume of fresh water flushed through the filtration vessel (204) is greater than one volume of the filtration vessel (204). In further embodiments, the volume of fresh water flushed through the filtration vessel (204) is equal to three times the volume of the filtration vessel (204).

Once the gravel has been flushed with the fresh water, the filtration vessel (204) may be used to begin the water filtration operation. To transition from the self-cleaning operation to the water filtration operation, the computer (302) may instruct the control system (202) to ensure the solvent vessel valve (246), the acid vessel valve (248), the fresh water vessel valve (250), and the cleaning input valve (254) are closed. The filtration input valve (234) is opened to allow the produced water to filter through the filtration vessel (204).

The cleaning output valve (260) may remain open while the produced water displaces the fresh water remaining in the filtration vessel (204). In other embodiments, the cleaning output valve (260) is closed, and the fresh water is displaced by the produced water through the filtration output valve (240).

As noted above, the fresh water may be flushed by the produced water through the filtration output valve (240) or the cleaning output valve (260). If the fresh water is being flushed out of the filtration vessel (204) through the cleaning output valve (260), when the fresh water has been flushed from the filtration vessel (204), the computer (302) may instruct the control system (202) to close the cleaning output valve (260) and open the filtration output valve (240).

At this point, the produced water is able to be filtered by the filtration vessel (204) and be transported to the secondary location, such as the injection wells (104). In accordance with further embodiments, a backwash line (262) may be used to flush out the lower void (218) during normal filtration operations. The backwash line (262) has a backwash valve (264) that may be opened or closed, by the control system (202) or manually, to enable water to flush out the lower void (218).

In accordance with one or more embodiments, the backwash line (262) may be used to flush out the lower void (218) to partially clean the system without initiating a full self-cleaning operation. The backwash line (262) provides a targeted and efficient way to address issues specifically in the lower void (218) of the filtration vessel (204) without engaging the full self-cleaning mechanism. This can be particularly useful for minor issues or as part of regular maintenance routines.

In accordance with one or more embodiments, the lower void (218) may need to be flushed out when there is minor clogging or sediment buildup in the lower void (218) that doesn't warrant a full cleaning cycle but still needs to be addressed to maintain efficient filtration. In other embodiments, the lower void (218) may need to be flushed out as part of routine maintenance procedures to prevent the accumulation of debris or to ensure the lower void (218) remains clear for optimal filtration performance.

The lower void (218) may also need to be flushed out if the control system (202) detects a pressure differential that indicates a potential issue in the lower void (218) but doesn't trigger the threshold for a full self-cleaning operation. The backwash line (262) may also be used to ensure that any residual cleaning agents or dislodged materials are fully flushed out from the lower void (218) after a full self-cleaning operation. The backwash line (262) may also be used to maintain operational efficiency especially if the system detects reduced flow rates or other indicators that suggest the lower void (218) might be partially obstructed.

Figure 3:
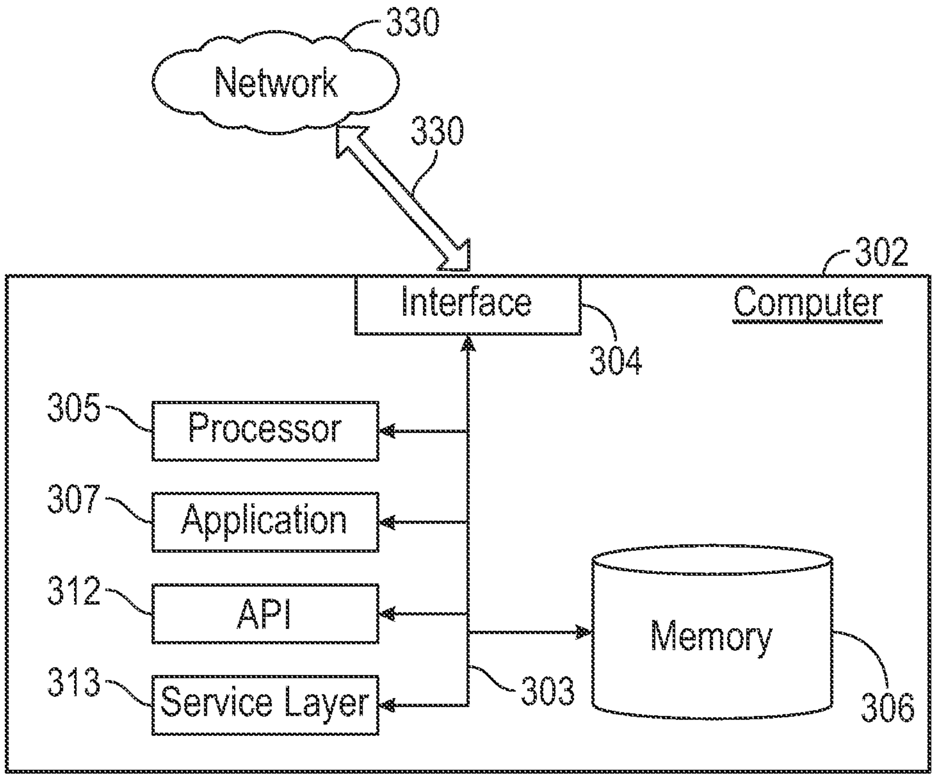
FIG. 3 shows a computer system in accordance with one or more embodiments.

FIG. 3 shows a computer (302) system in accordance with one or more embodiments. Specifically, FIG. 3 shows a block diagram of a computer (302) system used to provide computational functionalities associated with described algorithms, methods, functions, processes, flows, and procedures as described in the instant disclosure, according to an implementation. The illustrated computer (302) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer (302) may include a computer that includes an input device, such as a keypad, keyboard, touch screen, or other device that can accept user information, and an output device that conveys information associated with the operation of the computer (302), including digital data, visual, or audio information (or a combination of information), or a GUI.

The computer (302) can serve in a role as a client, network component, a server, a database or other persistency, or any other component (or a combination of roles) of a computer system for performing the subject matter described in the instant disclosure. The illustrated computer (302) is communicably coupled with a network (330). In some implementations, one or more components of the computer (302) may be configured to operate within environments, including cloud-computing-based, local, global, or other environment (or a combination of environments).

At a high level, the computer (302) is an electronic computing device operable to receive, transmit, process, store, or manage data and information associated with the described subject matter. According to some implementations, the computer (302) may also include or be communicably coupled with an application server, e-mail server, web server, caching server, streaming data server, business intelligence (BI) server, or other server (or a combination of servers).

The computer (302) can receive requests over network (330) from a client application (for example, executing on another computer (302)) and responding to the received requests by processing the said requests in an appropriate software application. In addition, requests may also be sent to the computer (302) from internal users (for example, from a command console or by other appropriate access method), external or third-parties, other automated applications, as well as any other appropriate entities, individuals, systems, or computers.

Each of the components of the computer (302) can communicate using a system bus (303). In some implementations, any or all of the components of the computer (302), both hardware or software (or a combination of hardware and software), may interface with each other or the interface (304) (or a combination of both) over the system bus (303) using an application programming interface (API) (312) or a service layer (313) (or a combination of the API (312) and service layer (313). The API (312) may include specifications for routines, data structures, and object classes. The API (312) may be either computer-language independent or dependent and refer to a complete interface, a single function, or even a set of APIs. The service layer (313) provides software services to the computer (302) or other components (whether or not illustrated) that are communicably coupled to the computer (302).

The functionality of the computer (302) may be accessible for all service consumers using this service layer. Software services, such as those provided by the service layer (313), provide reusable, defined business functionalities through a defined interface. For example, the interface may be software written in JAVA, C++, or other suitable language providing data in extensible markup language (XML) format or other suitable format. While illustrated as an integrated component of the computer (302), alternative implementations may illustrate the API (312) or the service layer (313) as stand-alone components in relation to other components of the computer (302) or other components (whether or not illustrated) that are communicably coupled to the computer (302). Moreover, any or all parts of the API (312) or the service layer (313) may be implemented as child or sub-modules of another software module, enterprise application, or hardware module without departing from the scope of this disclosure.

The computer (302) includes an interface (304). Although illustrated as a single interface (304) in FIG. 3, two or more interfaces (304) may be used according to particular needs, desires, or particular implementations of the computer (302). The interface (304) is used by the computer (302) for communicating with other systems in a distributed environment that are connected to the network (330). Generally, the interface (304) includes logic encoded in software or hardware (or a combination of software and hardware) and operable to communicate with the network (330). More specifically, the interface (304) may include software supporting one or more communication protocols associated with communications such that the network (330) or interface's hardware is operable to communicate physical signals within and outside of the illustrated computer (302).

The computer (302) includes at least one computer processor (305). Although illustrated as a single computer processor (305) in FIG. 3, two or more processors may be used according to particular needs, desires, or particular implementations of the computer (302). Generally, the computer processor (305) executes instructions and manipulates data to perform the operations of the computer (302) and any algorithms, methods, functions, processes, flows, and procedures as described in the instant disclosure.

The computer (302) also includes a non-transitory computer (302) readable medium, or a memory (306), that holds data for the computer (302) or other components (or a combination of both) that can be connected to the network (330). For example, memory (306) can be a database storing data consistent with this disclosure. Although illustrated as a single memory (306) in FIG. 3, two or more memories may be used according to particular needs, desires, or particular implementations of the computer (302) and the described functionality. While memory (306) is illustrated as an integral component of the computer (302), in alternative implementations, memory (306) can be external to the computer (302).

The application (307) is an algorithmic software engine providing functionality according to particular needs, desires, or particular implementations of the computer (302), particularly with respect to functionality described in this disclosure. For example, application (307) can serve as one or more components, modules, applications, etc. Further, although illustrated as a single application (307), the application (307) may be implemented as multiple applications (307) on the computer (302). In addition, although illustrated as integral to the computer (302), in alternative implementations, the application (307) can be external to the computer (302).

There may be any number of computers (302) associated with, or external to, a computer system containing computer (302), each computer (302) communicating over network (330). Further, the term "client," "user," and other appropriate terminology may be used interchangeably as appropriate without departing from the scope of this disclosure. Moreover, this disclosure contemplates that many users may use one computer (302), or that one user may use multiple computers (302).

Figure 4:
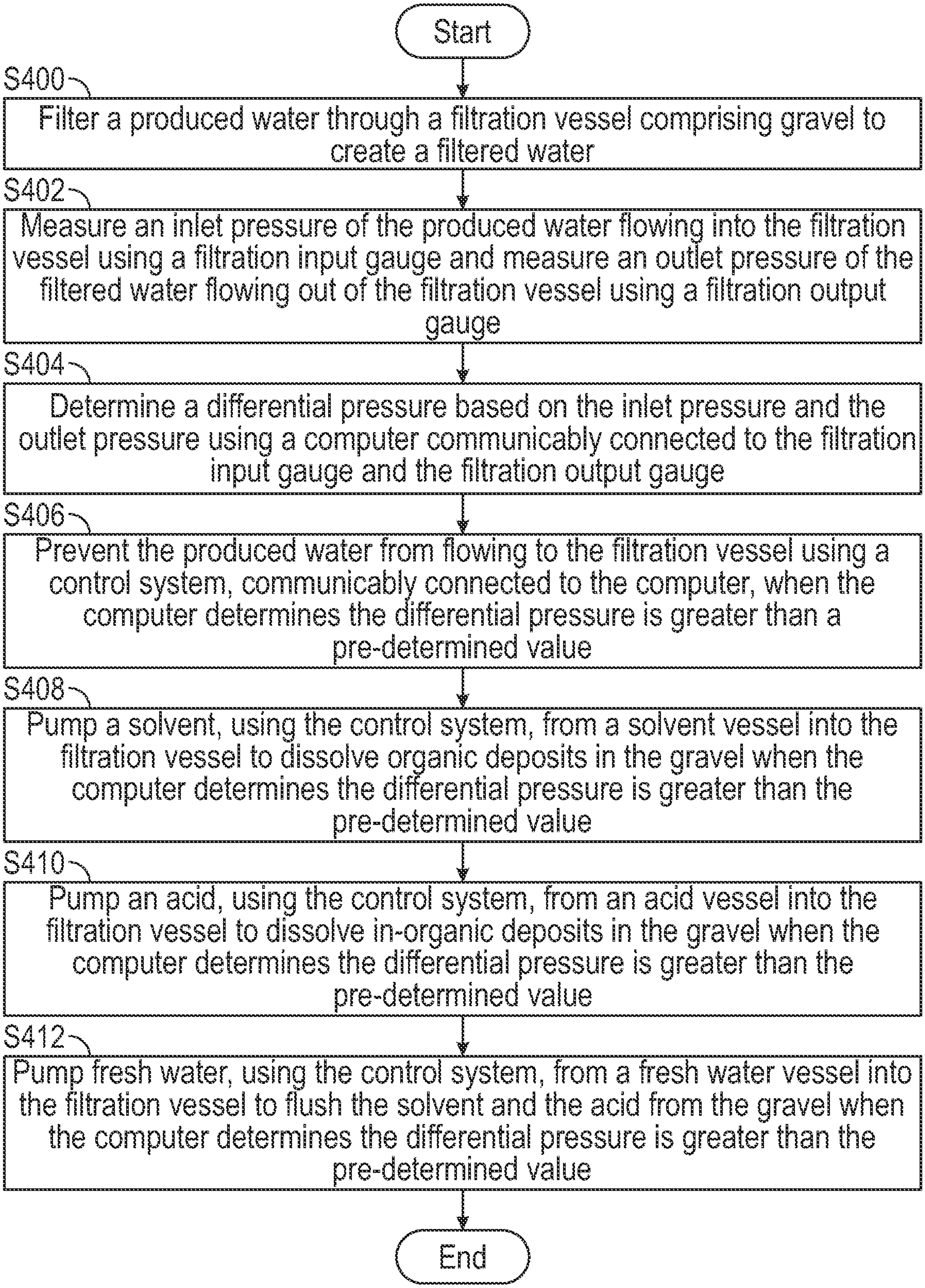
FIG. 4 shows a flowchart in accordance with one or more embodiments.

FIG. 4 shows a flowchart in accordance with one or more embodiments. The flowchart outlines a method for automatically filtering produced water using a filtration vessel (204) and automatically cleaning the filtration vessel (204). While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In S400, a produced water is filtered through a filtration vessel (204) comprising gravel to create a filtered water. In accordance with one or more embodiments, the filtration vessel (204) comprises three layers of gravel: a course gravel (208), a medium gravel (210), and a fine gravel (214). The filtration vessel (204) may also have a mesh sheet (216) used to hold up the layers of gravel to create a lower void (218) and further filter the produced water. Each of the layers of gravel filter smaller and smaller particles out of the produced water to create the filtered water.

In accordance with one or more embodiments, the produced water comes from a separation plant (100) that separates the produced water from produced fluid that is produced from a production well (102). Specifically, the produced water flows from the separation plant (100) into the filtration vessel via a filtration input line (230).

In accordance with one or more embodiments, the flow of the produced water from the filtration input line (230) into the filtration vessel (204) is controlled by a filtration input valve (234). The filtration input valve (234) is controllable by a control system (202) pumping hydraulic fluid into a control line (228) to open or close the filtration input valve (234).

In accordance with one or more embodiments, the filtered water flows out of the lower void (218) of the filtration vessel (204) through a filtration output line (236). The filtration output line (236) transports the filtered water away from the filtration vessel (204). The flow of filtered water out of the filtration vessel (204) and through the filtration output line (236) is controlled by a filtration output valve (240) located on the filtration output line (236). The filtration output valve (240) is controllable by the control system (202) pumping hydraulic fluid into the control line (228) to open or close the filtration output valve (240).

In S402, an inlet pressure of the produced water flowing into the filtration vessel (204) is measured using a filtration input gauge (232) and an outlet pressure of the filtered water flowing out of the filtration vessel (204) is measured using a filtration output gauge (238). In accordance with one or more embodiments, the filtration input gauge (232) is located on the filtration input line (230) and the filtration output gauge (238) is located on the filtration output line (236).

In S404, a differential pressure is determined based on the inlet pressure and the outlet pressure using a computer (302) communicably connected to the filtration input gauge (232) and the filtration output gauge (238). In accordance with one or more embodiments, the computer (302) may compare the differential pressure to a pre-determined value, such as the differential pressure of the produced fluid flowing though the filtration vessel (204) when the gravel is new or has just been cleaned.

When the computer (302) determines that the differential pressure is larger than the pre-determined value, the computer (302) may initiate the self-cleaning operation. As such, and in S406, the produced water from flowing to the filtration vessel (204) is prevented using a control system (202), communicably connected to the computer (302), when the computer (302) determines the differential pressure is greater than a pre-determined value.

In accordance with one or more embodiments and when the computer (302) determines that the differential pressure is larger than the pre-determined value, the computer (302) may send a signal to the control system (202) to close the filtration input valve (234) and the filtration output valve (240). The control system (202) may then close the filtration input valve (234) and the filtration output valve (240) by applying or removing a hydraulic pressure along the control lines (228). The control system (202) may also open a cleaning input valve (254) on a cleaning input line (242) hydraulically connecting a solvent vessel (220), an acid vessel (222), and a fresh water vessel (224) to the filtration vessel (204).

In S408 a solvent is pumped, using the control system (202), from a solvent vessel (220) into the filtration vessel (204) to dissolve organic deposits in the gravel when the computer (302) determines the differential pressure is greater than the pre-determined value. In accordance with one or more embodiments and when the computer (302) determines that the differential pressure is larger than the pre-determined value, the computer (302) may send a signal to the control system (202) to open the solvent vessel valve (246) located on a cleaning manifold (226).

The control system (202) also opens a cleaning output valve (260) on a cleaning output line (256). At this point, the solvent is pumped from the solvent vessel (220) into the filtration vessel (204) using the cleaning input line (242) and a pump (244). The solvent displaces the produced fluid in the filtration vessel (204). In further embodiments, the control system (202) may close the cleaning output valve (260) and stop the pump (244) to allow the solvent to soak the gravel for a pre-determined period of time, such as one hour.

After the solvent has soaked the gravel, and in S410, an acid is pumped, using the control system (202) from an acid vessel (222) into the filtration vessel (204) to dissolve inorganic deposits in the gravel when the computer (302) determines the differential pressure is greater than the pre-determined value. In accordance with one or more embodiments and when the computer (302) determines that the differential pressure is larger than the pre-determined value, the computer (302) may send a signal to the control system (202) to open the acid vessel valve (248) located on the cleaning manifold (226).

The control system (202) also opens the cleaning output valve (260) on the cleaning output line (256). At this point, the acid is pumped from the acid vessel (222) into the filtration vessel (204) using the cleaning input line (242) and the pump (244). The acid displaces the solvent in the filtration vessel (204). In further embodiments, the control system (202) may close the cleaning output valve (260) and stop the pump (244) to allow the acid to soak the gravel for a pre-determined period of time, such as one hour.

After the acid has soaked the gravel, and in S412, fresh water is pumped, using the control system (202), from a fresh water vessel (224) into the filtration vessel (204) to flush the solvent and the acid from the gravel when the computer (302) determines the differential pressure is greater than the pre-determined value. In accordance with one or more embodiments and when the computer (302) determines that the differential pressure is larger than the pre-determined value, the computer (302) may send a signal to the control system (202) to open the fresh water vessel valve (250) located on the cleaning manifold (226).

The control system (202) also opens the cleaning output valve (260) on the cleaning output line (256). At this point, the fresh water is pumped from the fresh water vessel (224) into the filtration vessel (204) using the cleaning input line (242) and the pump (244). The fresh water flushes the solvent and acid from the gravel in the filtration vessel (204). The volume of fresh water pumped may be larger than the volume of the filtration vessel (204) such that the fresh water fully flushes out any remaining solvent or acid in the filtration vessel (204).

Once the computer (302) has determined a sufficient amount of fresh water has been pumped, the computer (302) may send a signal to the control system (202) to close the fresh water vessel valve (250) and the cleaning input valve (254). The produced water may then be re-directed to the filtration vessel (204), using the computer (302) and the control system (202)) and the filtration operation may begin again.

In accordance with one or more embodiments, the produced water may be re-directed to the filtration vessel (204) from a back-up filtration vessel once a differential pressure value larger than the pre-determined value is sensed in the back-up filtration vessel by the computer (302). At this point, the cleaning operation, outlined above, may be performed on the back-up filtration vessel and the present filtration vessel (204) may commence the filtration operation.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A system comprising:

a filtration vessel comprising gravel configured to filter a produced water to create a filtered water;

a filtration input gauge configured to measure an inlet pressure of the produced water flowing into the filtration vessel;

a filtration output gauge configured to measure an outlet pressure of the filtered water flowing out of the filtration vessel;

a solvent vessel comprising a solvent configured to dissolve organic deposits in the gravel located in the filtration vessel;

an acid vessel comprising an acid configured to dissolve in-organic deposits in the gravel located in the filtration vessel;

a water vessel comprising water configured to flush the solvent and the acid from gravel located in the filtration vessel of the solvent and the acid;

a computer communicably connected to the filtration input gauge and the filtration output gauge and configured to determine a differential pressure based on the inlet pressure and the outlet pressure; and a control system communicably connected to the computer and configured to prevent the produced water from flowing to the filtration vessel and allow the solvent, acid, and water to flow to the filtration vessel when the computer determines the differential pressure is greater than a pre-determined value.

2. The system of claim 1, further comprising a filtration input line connected to the filtration vessel and configured to transport the produced water from a separation plant to the filtration vessel.

3. The system of claim 2, further comprising a filtration input valve located on the filtration input line, configured to open and close, and controllably connected to the control system via a control line.

4. The system of claim 1, further comprising a filtration output line connected to the filtration vessel and configured to transport the filtered water from the filtration vessel to an injection well.

5. The system of claim 4, further comprising a filtration output valve located on the filtration output line, configured to open and close, and controllably connected to the control system via a control line.

6. The system of claim 1, wherein the solvent vessel, the acid vessel, and the water vessel are hydraulically connected to the filtration vessel via a cleaning manifold, a pump, and a cleaning input line.

7. The system of claim 6, further comprising a solvent vessel valve located on the cleaning manifold, configured to open and close, and controllably connected to the control system via a control line.

8. The system of claim 6, further comprising an acid vessel valve located on the cleaning manifold, configured to open and close, and controllably connected to the control system via a control line.

9. The system of claim 6, further comprising a water vessel valve located on the cleaning manifold, configured to open and close, and controllably connected to the control system via a control line.

10. The system of claim 1, further comprising a cleaning output line comprising a cleaning output valve, wherein the cleaning output line is configured to transport the solvent, acid, and water away from the filtration vessel and the cleaning output valve is configured to open and close and is controllably connected to the control system via a control line.

* * * * *